Dec. 11, 1951 A. C. CHRISTY 2,578,043
ELECTROVIBRANT HIGH-VOLTAGE SUPPLY
Filed Dec. 28, 1948
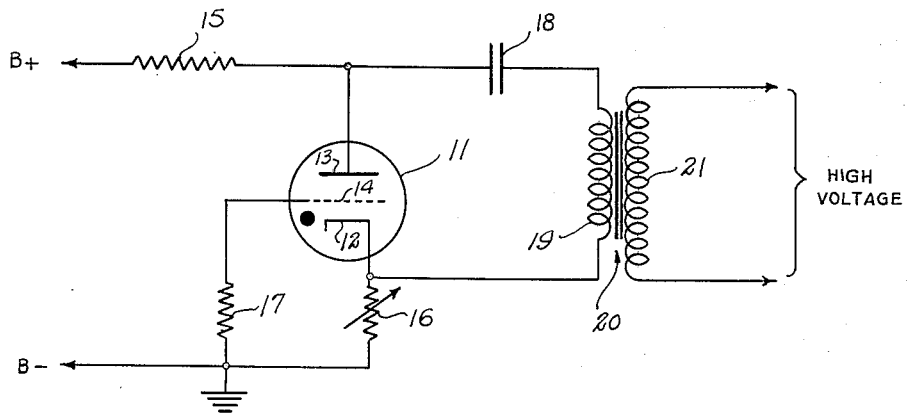
FIG. 1.
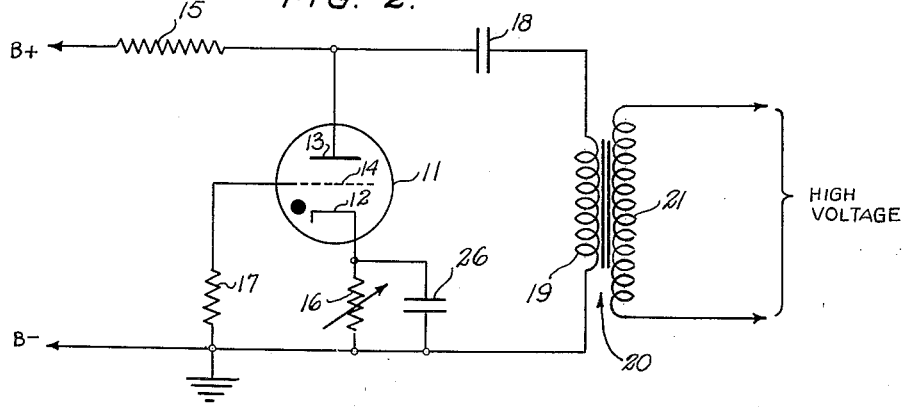
FIG. 2.
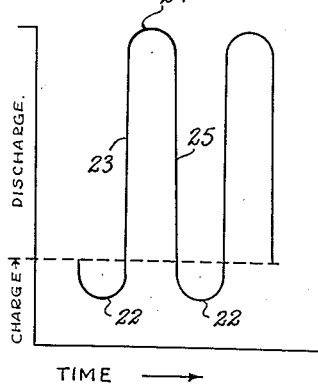
FIG. 3.
FIG. 4.
INVENTOR.
ALEXANDER C. CHRISTY,
BY
McMorrow, Berman & Davidson
ATTORNEYS.

Patented Dec. 11, 1951

2,578,043

UNITED STATES PATENT OFFICE 2,578,043

ELECTROVIBRANT HIGH-VOLTAGE SUPPLY

Alexander C. Christy, Morgantown, W. Va.

Application December 28, 1948, Serial No. 67,742

5 Claims. (Cl. 250—36)

1

This invention relates to high voltage generation, and more particularly to electronic high voltage generators for use as sources of high voltage in television projection systems, electronic ignition systems for internal combustion engines, radar transmission, photo-flash units, and numerous other devices employing high voltages.

A main object of the invention is to provide a method and means for developing high voltages employing very simple and inexpensive components, involving no moving parts, and operating at high efficiency.

A further object of the invention is to provide an improved high voltage generator which is easy to construct, employs only a few components, is compact in size, and requires no amplifying equipment.

A still further object of the invention is to provide an improved electronic high voltage generator which is rugged in construction, employs standard parts, and which is especially suitable for use as a high voltage source for cathode ray tubes as employed in television and radar, as a high voltage source for ignition in internal combustion engines, and for numerous additional devices requiring high voltage.

Further objects and advantages of the invention will become apparent from the following description and claims, and from the accompanying drawings, wherein:

Figure 1 is a schematic diagram of an electronic high voltage generator constructed in accordance with the present invention;

Figure 2 is a schematic diagram illustrating another form of electronic high voltage generator according to the present invention;

Figure 3 is a graph showing the form of the output voltage wave generated by the devices of Figures 1 and 2.

Figure 4 is a schematic diagram illustrating another form of the invention wherein a cold cathode tube is employed.

Referring to the drawings, and more particularly to Figure 1, 11 designates a grid-controlled gaseous conduction tube, such as a thyratron or similar type of gas-filled triode. Tube 11 is shown as having a cathode 12, an anode 13, and a control grid 14. The tube is filled with suitable inert gas, such as neon, argon, hydrogen, mercury vapor, or the like. The cathode 12 may be either of the heated filament type, indirectly-heated type, or may be a cold cathode.

The anode 13 is connected to the positive terminal of a direct current supply source of the order of 100 to 350 volts through an impedance or resistor 15 which substantially blocks the entrance of alternating high-voltage current into the direct current supply source and also limits the D. C. current flow through the gaseous conduction tube 11. The negative terminal of the direct current supply source is connected to cathode 12 through a biasing resistor 16. The grid 14 of the tube is connected to the negative terminal of the direct current supply source through a leak resistor 17.

Connected in series across the anode 13 and the cathode 12 are a capacitor 18 and the primary 19 of the high-voltage output transformer 20. The secondary of transformer 20 is shown at 21 and preferably has many more turns than the primary 19.

The cathode resistor 16 may be of a variable type, as shown, so that the bias voltage of the grid 14 may be adjusted to make the gaseous tube 11 conduct at different discharge potentials of the condenser through the coil 19, thereby controlling the amplitude of the output voltage in the secondary 21.

When the source of direct current is connected to the circuit of Figure 1, a large current initially flows through the cathode resistor 16 and primary 19 to charge the condenser 18. This produces a voltage drop across resistor 16 which biases grid 14 sufficiently negative to prevent the gaseous tube from conducting. The charging circuit has relatively low resistance, allowing charging to occur rapidly. As the charge on the condenser 18 increases, the charging rate decreases, reducing the current flow through cathode resistor 16. This eventually decreases the negative bias on grid 14 to a value where ionization of the gas in tube 11 occurs, allowing the tube to conduct. The condenser 18 then rapidly discharges through primary 19 and tube 11. When the charge on the condenser is substantially dissipated, the tube ceases to conduct and remains in a non-conducting state as the condenser 18 again is charged. While the charging rate is high, grid 14 is biased sufficiently negative to prevent the tube from conducting, as above stated. As in the previous cycle, discharge of the condenser occurs when the charging rate drops to a value insufficient to produce cut-off bias across resistor 16.

The operation of tube 11 in the circuit of Figure 1 may be explained as follows:

Assuming resistor 16 to have a value such that in the absence of the output circuit containing condenser 18 and primary 19, tube 11 would be biased not quite to cut-off, the charging current passes through said resistor to thereby increase the voltage drop across the resistor to a value greater than the cut-off bias value. This causes tube 11 to cut off until condenser 18 has become charged to that point where the charging current through resistor 16 fails to produce cut-off bias voltage across the resistor. Tube 11 then conducts heavily and condenser 18 dissipates rapidly, since there is very little resistance in its discharge circuit. A heavy-current pulse flows through primary 19 in a very short time period. This induces a very high voltage in said primary, since the induced voltage e in an inductance L as a function of current i through the inductance and time t is given by:

$$e = L\frac{di}{dt}$$

At the initiation of the discharge of the condenser 18, the current through primary 19 increases rapidly. A peak current is reached in said primary. Prior to the reaching of this peak current, the induced voltage across primary 19 has a polarity such that cathode 12 is negative with respect to the negative terminal of the voltage source. Grid 14, therefore, in effect has a positive bias and does not interfere with current flow through the tube. After the peak current has been reached in primary 19, the current begins to decrease with time, which reverses the polarity of the induced voltage across said primary. Cathode 12 becomes positive with respect to the negative terminal of the voltage source, creating a negative bias on grid 14. Since the induced voltage is high, said negative bias drives tube 11 deep into cut-off. By the time tube 11 cuts off, condenser 18 is sufficiently dissipated to receive a new charge. Charging current then flows through resistor 16, maintaining the cut-off bias on the tube, as above described, until the charging rate decreases below the value necessary to develop cut-off bias, repeating the above-described cycle. Referring to Figure 3, the charging current through primary 19 induces in secondary winding 21 a voltage wave portion shown at 22. Discharge of condenser 18 produces in secondary 21 a steeply-rising voltage wave portion shown at 23. As the peak of the current pulse through primary 19 occurs, a voltage peak 24 appears across secondary 21. The reversal of polarity of the induced voltage in primary 19 coincides with the steeply-descending voltage wave portion 25 of Figure 3, during which tube 11 is driven into cut-off. As the new charging cycle of condenser 18 begins, the next trough 22 appears in the voltage wave across secondary 21.

In the form of the invention shown diagrammatically in Figure 2, the primary 19 of the output transformer 20 is connected between condenser 18 and the negative terminal of the D. C. voltage source instead of between condenser 18 and cathode 12, as in Figure 1. A condenser 26 is connected across resistor 16. When the D. C. source voltage is applied to the circuit of Figure 2, a charging current initially flows through condenser 18 and primary 19, in effect shunting tube 11 and holding the voltage between plate 13 and cathode 12 below the potential required to ionize the tube until condenser 18 has become substantially charged. As condenser 18 becomes charged, the voltage between plate 13 and cathode 12 rises until it eventually reaches the required ionizing potential. Tube 11 then conducts. Condenser 18 discharges and a heavy-current pulse flows through tube 11 and primary 19. Prior to the attainment of peak current in primary 19, the polarity of the induced voltage in said primary opposes the voltage drop developed by the discharge current across resistor 16, preventing grid 14 from becoming sufficiently negative to cut off the tube. After peak current in primary 19, the induced voltage therein reverses in polarity and allows grid 14 to reach cut-off negative bias. Tube 11 no longer conducts. By this time, condenser 18 is substantially discharged. The cycle then repeats. Condenser 26 acts as a by-pass for part of the pulsating current in the discharge circuit and regulates the degree of the excursions of voltage on the grid 14. The shape of the voltage wave obtained across the terminals of the secondary 21 is substantially the same as obtained in the circuit of Figure 1 and shown in Figure 3.

Repetition rates of the output voltage pulses may be made as high as 20,000 per second, since the polarity of capacitor 18 in either of the above-described forms of the invention, reverses during discharge, lowering the required deionization period of the tube 11. Output voltages as high as 60,000 volts may be obtained.

The gaseous conduction tube has an operating efficiency of the order of 98% because of the low voltage drop of the tube and because there is no power dissipated in the anode when the gaseous tube is not conducting. The tube is, therefore, capable of delivering great amounts of power. In an actual working model an output of 20,000 volts at 2 milliamperes was obtained with an input of 350 volts current at 130 milliamperes in a unit measuring 2 inches by 3½ inches in size.

The high voltage output may be employed directly to provide ignition voltages for internal combustion engines, or in conjunction with a conventional high voltage rectifier as a source of high voltage for television projection systems.

Figure 4 shows diagrammatically a form of the invention employing a cold cathode gaseous conduction tube 11'. The positive voltage is applied to the plate 13' through a limiting resistor 15', charging the condenser 18' which is in series with the primary coil 19'. The series-connected condenser 18' and coil 19' are connected across the plate 13' and cathode 12' of the tube 11'. The potentiometer 16' is connected across the plate 13' and cathode 12' and its variable tap is connected to the grid 14', making said grid positive with respect to cathode 12' to initiate the conduction of tube 11'. When the condenser is charged to the ionization potential of the tube 11' and discharges, a heavy current flows instantaneously through the tube 11' and primary 19', inducing a high voltage in the secondary 21'. After discharge, the tube 11' is in a non-conducting state, allowing condenser 18' to receive another charge, whereby the cycle is repeated. By using a cold cathode tube, as in Figure 4, the need for a source of filament current for the tube is eliminated.

Although shown in the drawings as employing tubes of the triode type, multiple grid tubes, such as tetrodes, pentodes, and the like, may also be employed within the spirit of the present invention.

While certain specific embodiments of electronic high voltage generating devices have been disclosed in the foregoing description, it will be understood that various modifications within the spirit of the invention may occur to those skilled in the art. Therefore, it is intended that no limitations be placed on the invention, except as defined by the scope of the appended claims.

What is claimed is:

1. A high voltage generator of the character described comprising a gaseous conduction triode, a source of direct current potential, non-reactive means connecting the plate of said triode to the positive terminal of said source, means connecting the grid of said triode to the negative terminal of said source, a grid-biasing resistor connected between the cathode of said triode and said negative terminal, and a reactive circuit connecting the plate to said cathode, said circuit including a condenser and the primary of a step-up transformer connected in series, whereby initially the charging current charging the condenser flows through said resistor and provides a bias preventing the triode from conducting, said bias being removed when the condenser becomes charged, allowing the triode to conduct, and causing the condenser to discharge through said primary, the discharge current producing a high induced voltage in the secondary of said step-up transformer.

2. A high voltage generator of the character described comprising a gas triode, a source of direct current, the plate of said triode being connected to the positive terminal of said source, a grid biasing resistor connected between the cathode of said triode and the negative terminal of said source, means connecting the grid of the triode to said negative terminal, a condenser, a step-up transformer, and means connecting the condenser and the primary of said transformer in series between said plate and said cathode, whereby initially the charging current charging the condenser flows through said resistor and provides a bias preventing the triode from conducting, said bias being removed when the condenser becomes charged, allowing the triode to conduct, and causing the condenser to discharge through said primary, the discharge current producing a high induced voltage in the secondary of said transformer.

3. A high voltage generator of the character described comprising a gas triode, a source of direct current, the plate of said triode being connected to the positive terminal of said source, a grid biasing resistor connected between the cathode of said triode and the negative terminal of said source, means connecting the grid of the triode to said negative terminal, a condenser, a step-up transformer, said condenser and the primary of the transformer being connected in series between said plate and said cathode, whereby initially the charging current charging the condenser flows through said resistor and provides a bias preventing the triode from conducting, said bias being removed when the condenser becomes charged, allowing the triode to conduct, and causing the condenser to discharge through said primary, the discharge current producing a high induced voltage in the secondary of said step-up transformer.

4. A high voltage generator of the character described comprising a gas triode, a source of direct current, the plate of said triode being connected to the positive terminal of said source, a grid biasing resistor connected between the cathode of said triode and the negative terminal of said source, means connecting the grid of the triode to said negative terminal, a condenser, a step-up transformer, said condenser and the primary of the transformer being connected in series between said plate and said negative terminal, whereby initially the charging current charging the condenser flows through said condenser and primary, providing relatively low plate potential preventing the triode from conducting, said plate potention being increased when the condenser becomes charged, allowing the triode to conduct, and causing the condenser to discharge through said primary, the discharge current producing a high induced voltage in the secondary of said transformer.

5. A high voltage generator of the character described comprising a gas triode, a source of direct current, the plate of said triode being connected to the positive terminal of the source, means connecting the cathode of said triode to the negative terminal of said source, circuit means connecting the grid and cathode of the triode and including a resistor arranged to provide a bias on the grid of the triode, a condenser, a step-up transformer, and circuit means connecting said condenser and the primary of said transformer in series between the plate and the cathode of the triode, said circuit means being arranged to maintain the triode non-conducting while the condenser is charging and to allow the triode to conduct when the condenser is substantially charged, whereby the condenser discharges through said primary and the triode, the discharge current causing a high voltage to be induced in the secondary of said transformer.

ALEXANDER C. CHRISTY.

REFERENCES CITED

The following references are of record in the file of this patent:

UNITED STATES PATENTS

| Number | Name | Date |
|---|---|---|
| 1,898,827 | Franklin et al. | Jan. 28, 1931 |
| 1,926,181 | Schramm | Sept. 12, 1933 |
| 2,097,066 | Hoover | Oct. 26, 1937 |
| 2,108,219 | Swart | Feb. 15, 1938 |
| 2,251,877 | Hagerdorn | Aug. 5, 1941 |

FOREIGN PATENTS

| Number | Country | Date |
|---|---|---|
| 426,002 | Great Britain | Mar. 26, 1935 |
| 206,222 | Great Britain | July 31, 1939 |